United States Patent [19]
Carey

[11] Patent Number: 5,391,837
[45] Date of Patent: Feb. 21, 1995

[54] COVERED CONDUIT BOX HAVING A COVER WHICH CAPTURES SCREWS

[75] Inventor: Timothy W. Carey, Grabill, Ind.

[73] Assignee: General Electric Company, Fort Wayne, Ind.

[21] Appl. No.: 4,802

[22] Filed: Jan. 15, 1993

[51] Int. Cl.⁶ .............................................. H02G 3/08
[52] U.S. Cl. ..................................... 174/50; 220/3.8; 220/305; 220/327; 310/71; 310/89
[58] Field of Search ............................ 174/50, DIG. 2; 220/3.8, 305, 327; 310/71, 89

[56] References Cited

U.S. PATENT DOCUMENTS

| | | | |
|---|---|---|---|
| 1,927,780 | 9/1933 | Anderson | 220/3.8 X |
| 2,272,178 | 2/1942 | McDowell et al. | 174/50 |
| 4,036,389 | 7/1977 | Pate et al. | 220/3.8 |
| 4,167,196 | 9/1979 | Morris | 137/360 |
| 4,214,667 | 7/1980 | Lass | 220/3.2 |
| 4,295,575 | 10/1981 | Flachbarth | 220/3.92 |
| 4,355,198 | 10/1982 | Gartland, Jr. | 174/66 |
| 4,449,777 | 5/1984 | Baribeau | 339/103 R |
| 4,504,698 | 3/1985 | Greenwood | 174/66 |
| 4,580,689 | 4/1986 | Slater | 220/3.2 |
| 4,664,281 | 5/1987 | Falk et al. | 174/50 |
| 5,192,888 | 3/1993 | Fleer | 310/71 |

*Primary Examiner*—Leo P. Picard
*Assistant Examiner*—David Tone
*Attorney, Agent, or Firm*—Ralph E. Krisher, Jr.

[57] ABSTRACT

A covered conduit box includes a cover which maintains screws, used to fix the cover to a base member of the box, captive, when the cover is disengaged. The cover includes stepped screw bores therein which allow the screws to cock slightly relative to the cover, to engage in mating channels provided in flanges on the base member, the flanges being angled away from the cover to provide a torque upon the screws, maintaining engagement between the cover and the body. The stepped screw bore maintains the screw captured within the bore unless pressure is applied against the end of the screw to cause a thread thereof to interact with sidewalls of the bore, at which point the screw can be disengaged from capture therein.

11 Claims, 3 Drawing Sheets

FIG_1

COVERED CONDUIT BOX HAVING A COVER WHICH CAPTURES SCREWS

BACKGROUND OF THE INVENTION

1. Field of the Invention

The present invention pertains to a covered conduit box for use in allowing access to wiring for an apparatus such as a motor, wherein a cover of the conduit box maintains screws, used to secure the cover to a base of the box, captured therein upon disengagement of the cover from the base.

2. Description of the Prior Art

Heretofore various manners of maintaining screws captive in a structure have been proposed.

For example, the Slater U.S. Pat. No. 4,580,689 discloses an electrical outlet box having a pair of integral bosses that angularly align, engage and retain wiring device mounting screws therein. The bosses each have a throughbore for receiving the screws comprising in sequence a frustoconical surface, a first cylindrical surface having a diameter slightly larger than the crest diameter of the mounting screw thread, and a second cylindrical surface having a diameter slightly smaller than the crest diameter of the screw thread and slightly larger than the root diameter of the screw thread. The frustoconical and two cylindrical surfaces are coaxial, with the frustoconical and first cylindrical surfaces angularly aligning the screw substantially coaxially of the bore and engaging the screw to resist inadvertent removal of the screw from the bore, and the second cylindrical surface threadedly retaining the screw therein upon rotation of the screw along that surface.

Retaining clips and rings for use in maintaining screw engagement have also been proposed, as in U. S. Pat. No. 4,214,667 to Lass, U.S. Pat. No. 4,036,389 to Pate et al., U.S. Pat. No. 4,449,777 to Baribeau and U.S. Pat. No. 4,295,575 to Flachbarth.

Also, load absorbing screw engagement is proposed in the Greenwood U.S. Pat. No. 4,504,698 and a vandal proof secured nut and bolt engagement is disclosed in the Morris U.S. Pat. No. 4,167,197.

As will be described in greater detail hereinafter, the box and cover with captive screws therein of the present invention differs from structures previously proposed by causing captivity of a screw within a primary orifice for same, while at the time of engagement to a secondary body relative thereto, causing a torque action which acts upon screw thread to maintain the structures engaged.

SUMMARY OF THE INVENTION

According to the invention there is provided a covered conduit box having a housing which incorporates a cover member and a base member. The base member includes a pair of flanges which frame two opposite sides of an open surface thereof over which the cover seats. These flanges angle away from cooperating wings provided on the cover to cause screws engaged therebetween to cock, maintaining engagement between the cover and the base member. The bore for the screws provided in the cover flanges is stepped, with a narrow bore portion equal in thickness to an unthreaded area adjacent the head of the screw and having a diameter approximately equal to the root diameter of the screw creating a first bore portion and having a wider bore portion formed therebeneath which has a diameter greater than the crest diameter of the screw thread. Extruded channels are provided in the wings of the base member which coact with the bores in the cover flanges.

Still further according to the invention there is provided a method for forming the covered conduit box including the steps of: stamping out a five sided conduit box base member, the base member including a pair of flanges framing two sides of an open surface thereof and extending outwardly from supporting sidewalls thereof, and said flanges each including an extruded perpendicular channel therein; stamping out a planar cover member having two wings therein which overlie the flanges on the conduit box base member when placed thereover, the wings each incorporating a coined, stepped in diameter bore therein which overlies a corresponding channel in the base member, a first, upper smaller in diameter portion of the bore having a diameter slightly greater than the root diameter of thread of the screw but less than the crest diameter of the thread and a second lower larger in diameter portion having a diameter greater than the crest diameter of the thread; flexing the base member flanges toward the supporting sidewalls at an acute angle thereto; engaging a first cooperating screw in a bore of the cover and beginning engagement thereof within a corresponding base member channel; fully engaging a second cooperating screw in a second bore of the cover; and fully completing engagement of the first screw.

DESCRIPTION OF THE PREFERRED EMBODIMENT

Figure 1:
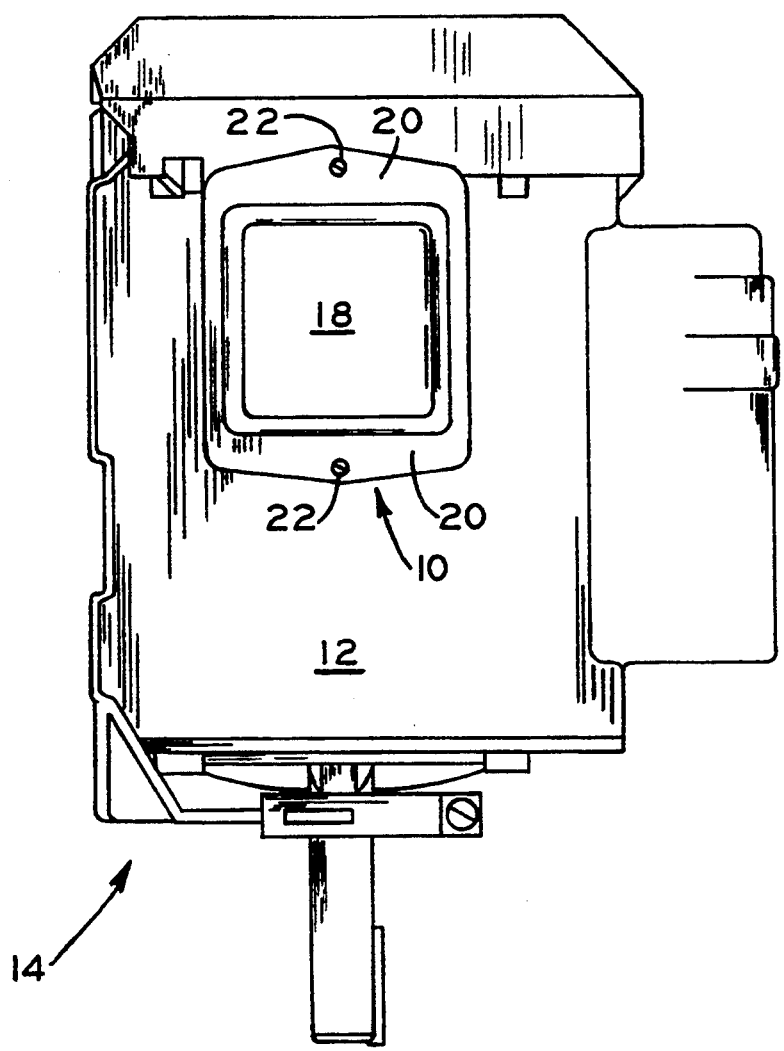
FIG. 1 is a side elevational view showing a motor housing incorporating the conduit box of the present invention thereon.
Figure 2:
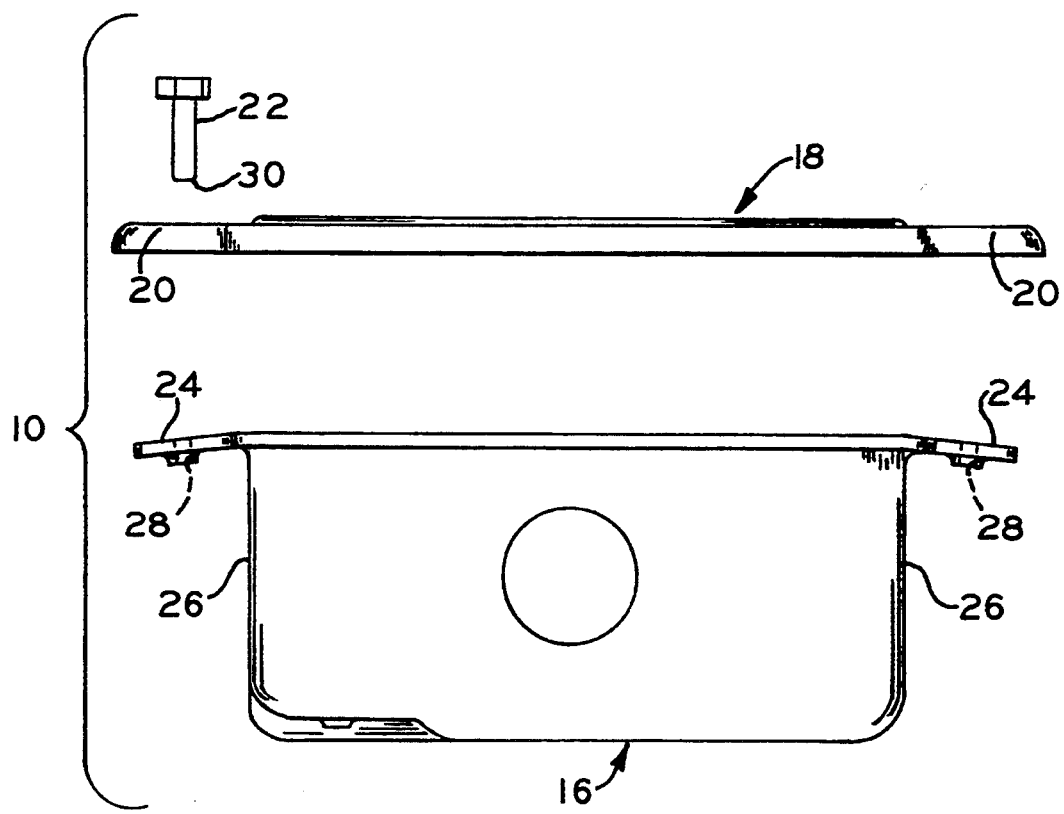
FIG. 2 is a side view of the conduit box of FIG. 1.
Figure 3:
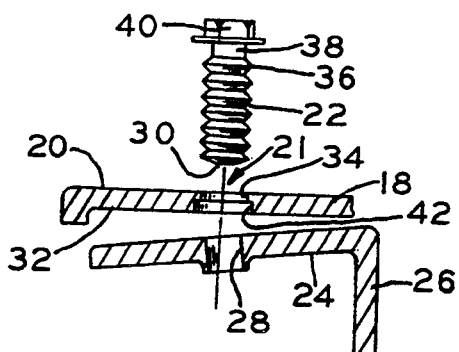
FIG. 3 is an enlarged cross sectional view through the area of engagement between a base member or body and a cover of the conduit box.
Figure 4:
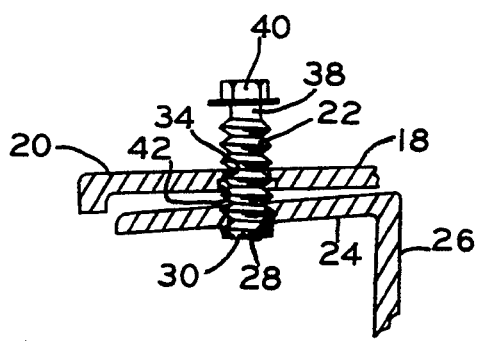
FIG. 4 is similar to FIG. 3 and shows a screw beginning to engage the cover to the base member.
Figure 5:
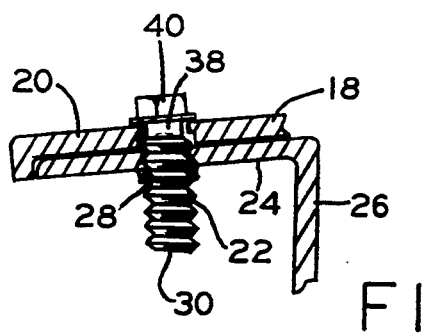
FIG. 5 is similar to FIG. 4 and shows complete engagement between the cover and the base member.
Figure 6:
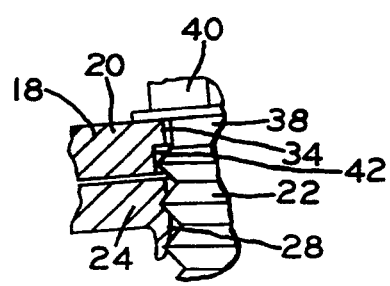
FIG. 6 is an enlarged cross sectional view of the area of engagement between the screw, the cover and the base member of the conduit box.

Referring now to the drawings in greater detail, there is illustrated therein the covered conduit box of the present invention generally identified by the reference numeral 10. The conduit box 10 is shown mounted on a casing 12 of a motor 14.

The box 10 is of simple two piece construction, comprising a five sided base member or body 16 and a cover 18 which engages over an open face of the base member 16. The cover 18 includes two lateral wings 20, each of which has a bore 21 therein which uniquely accommodates a screw 22.

The base member 16 has an open face which is flanked by laterally extending flanges 24 which underlie the wings 20 on the cover 18 when the cover 18 is engaged to the base member 16, over the open face thereof, to create the closed conduit box 10.

The flanges 24 on the base member 16 do not lie perpendicular to side walls 26 of the base member 16 from which they extend. Rather, they angle away from the perpendicular by several degrees, and preferably by approximately 6 degrees. The flanges 24 further angle away from the wings 20 on the cover 18, which are perpendicular to the sidewalls 26 of the base member 16 when placed thereover.

Each flange 24 includes a bore defining extruded channel 28 extending therethrough and downwardly therefrom, the channel 28 lying in a plane perpendicular to that of the flange 24.

Because of angulation of the flanges 24 relative to the plane of the cover 18 wings 20, when a screw 22 is to engage the cover 18 to the base member 16, the screw 22 must be able to cock within the bore 21 in the cover 18 wing 20 to accommodate the angulation of the channel 28 within the base flange 24 relative thereto.

In this respect, when the screw 22, which is thread forming or self-tapping, begins to engage the cover 18 to the base member 16, the screw 22 enters the bore 21 in the wing 20 of the cover 18 and, when a tip 30 thereof engages within the flange 24 channel 28, the screw 22 becomes cocked. As engagement continues the angulation of the screw 22 increases until the wing 20 and flange 24 are parallel. This tipping or cocking during engagement is accommodated by providing a stepped diameter to the bore 21 in the cover 18, the diameter of the bore 21 increasing toward an underside 32 of the wing 20.

Placement of such tension upon the screw 22 by the angulation makes potential disengagement more difficult. In this respect, the primary purpose of the conduit box 10 is to accommodate therein circuitry wiring for the motor 14, the conduit box 10 typically being mounted upon such motor 14 and therefore being subjected to vibration.

Such vibration, as is known, can cause screws to loosen if tension is not placed thereupon. Such loosening could result in the circuitry wiring being exposed to the ambient environment for extended periods, causing harm to the wiring. Thus, angulation of the flanges 24 serves a two fold purpose. Not only does it create tension on the screws 22, it also causes the cover 18 to seat more securely on the base member 16, maintaining the cover 18 engaged against the base member 16.

With respect to the configuration of the screw bores 21 in the cover 18, it will be seen that a first or upper smaller in diameter portion 34 of the bore 21 is sized and configured to prevent disengagement of a screw 22 threadedly engaged therein.

In this respect, the smaller in diameter portion 34 of the bore 21 has a diameter which is slightly greater than the root diameter of the screw 22 and less than the crest diameter of the screw thread 36. The thickness or depth of the portion 34, as related to structures on the screw 22 which it is to capture, is thinner than an area 38, adjacent a screw head 40, which is unthreaded. Thus, the unthreaded area 38 of the screw 22 extends one half thread from the head 40 and engages within the smaller in diameter portion 24, being unable to unseat from engagement therein until a slight backpressure is applied against a tip 34 of the screw to cause engagement of the screw thread 36 and wall defining the portion 34. Such a stepped bore 34 may be achieved by coining.

A second or bottom larger in diameter portion 42 of the bore 21 is greater in diameter than the crest diameter of thread 36 of the screw 22. Such diameter allows the screw 22 to angle within the bore 21, accommodating engagement of the screw 22 within the channel 28 in the flange 24 of the base member 16.

In producing the base member 16 of the conduit box 10, it is formed in known manner but now is provided with the flanges 24 which are angled by several degrees from perpendicular, and as related to the sidewalls 26 from which the flanges 24 extend.

Next, the cover 18 is formed in known manner but is provided with the wings 20 into which the stepped bores 21 are coined.

The base member 16 is then attached to the motor housing 12 in known manner, circuitry wiring is fed thereinto, and the cover 18 is engaged thereover.

With respect to engagement of the cover 18 onto the base member 16, one screw 22 is started until it engages within the respective bore 21. Once a slight degree of engagement is produced, another screw is started into the bore 21 in the opposite wing 20 and is engaged firmly. Then, the first engaged screw 22 is tightened into engagement.

Alternatively, one screw 22 may be completely engaged first. Then pressure must be applied against the cover 14 to bring wing 20 into proximity with corresponding flange 24, and then the second screw 22 may be completely engaged.

Upon removal of the screws 22 from engagement within the flanges 24, as a first of two screws 22 is being released, action of the second screw 22 causes the cover to angulate at an acute angle to the base member, the cover 18 becoming parallel to the flange including the second, still engaged screw 22.

When the second screw 22 is disengaged, the cover is easily removed, with the screws 22 remaining captured in the bores 21 in the cover wings 20.

The capture of the screws 22 in the cover 18 will provide a cost effective solution to loss of such small articles and will save time in labor needed to locate replacement screws.

In the event that a screw 22 may become stripped, it is possible to forcibly remove the screw 22 from captivity within the bore 21. In this respect, application of pressure against a tip 30 of the screw 22 during turning of the screw 22 in a disengaging direction will break the screw 22 out of captivity for replacement.

It will be understood that the element of capture is not lost upon replacement of the original screw 22 the replacement screw 22 becoming captured in the bore 21 as well upon engagement therein.

As described above, the conduit box 10 of the present invention has a number of advantages, some of which have been described above and others of which are inherent in the invention. Also, modifications can be proposed to the conduit box 10 without departing from the teachings herein. Accordingly, the scope of the invention is only to be limited as necessitated by the accompanying claims.

I claim:

1. A covered conduit box having a housing which incorporates a cover member and a base member engageable to one another by screws, the base member including a pair of flanges which frame two opposite sides of an open surface thereof over which the cover seats, the flanges angling away from cooperating wings provided on the cover to cause screws engaged therebetween to angulate, maintaining engagement between the cover and the base member, a bore for the screws provided in the cover wings being stepped with a narrow bore portion equal in thickness to an unthreaded area adjacent the head of the screw and having a diameter approximately equal to the root diameter of the screw creating a first bore portion and having a wider bore portion formed therebeneath which has a diameter greater than the crest diameter of the screw thread, extruded channels being provided in the flanges of the base member which coact with the bores in the cover wings.

2. A method for forming a covered conduit box including the steps of:
   preselecting a particular sized screw for use, said screw having an unthreaded area adjacent a head thereof;
   stamping out a five sided conduit box base member, the base member including a pair of flanges framing two sides of an open surface thereof and extending outwardly from supporting sidewalls thereof, and said flanges each including an extruded perpendicular channel therein;
   stamping out a planar cover member having two wings therein which overlie the flanges on the conduit box base member when placed thereover, the wings each incorporating a coined, stepped in diameter bore therein which overlies a corresponding channel in the base member, a first, upper smaller in diameter portion of the bore having a diameter slightly greater than a root diameter of thread of the screw but less than a crest diameter of the thread and a second lower larger in diameter portion having a diameter greater than the crest diameter of the thread;
   flexing the base member flanges toward the supporting sidewalls at an acute angle thereto;
   engaging a first cooperating screw in a bore of the cover and beginning engagement thereof within a corresponding base member channel;
   fully engaging a second cooperating screw in a second bore of the cover; and
   fully completing engagement of the first screw.

3. In combination with an electric motor and a housing thereof, a covered conduit box having a cover member and a base member, the base member being engaged to said motor housing and having motor wiring fed thereinto, the base member including a pair of flanges which frame two opposite sides of an open surface thereof over which the cover seats, the flanges angling away from cooperating wings provided on the cover to cause screws engaged therebetween to angulate, maintaining engagement between the cover and the base member, a bore for the screws provided in the cover wings being stepped with a narrow bore portion equal in thickness to an unthreaded area adjacent the head of the screw and having a diameter approximately equal to the root diameter of the screw creating a first bore portion and having a wider bore portion formed therebeneath which has a diameter greater than the crest diameter of the screw thread, extruded channels being provided in the flanges of the base member which coact with the bores in the cover flanges.

4. A method of forming a conduit box having a cover which captures screws and engaging same to a housing of an electric motor for containment of motor circuitry wiring therein, the method comprising the steps of:
   stamping out a five sided conduit box base member, the base member including a pair of flanges framing two sides of an open surface thereof and extending outwardly from supporting sidewalls thereof, and said flanges each including an extruded perpendicular channel therein;
   stamping out a planar cover member having two wings therein which overlie the flanges on the conduit box base member when placed thereover, the wings each incorporating a coined, stepped in diameter bore therein which overlies a corresponding channel in the base member, a first, upper smaller in diameter portion of the bore having a diameter slightly greater than the root diameter of thread of the screw but less than the crest diameter of the thread and a second lower larger in diameter portion having a diameter greater than the crest diameter of the thread;
   flexing the base member flanges toward the supporting sidewalls at an acute angle thereto;
   mounting the flanged base member to the motor housing;
   feeding motor circuitry wiring into the base member through opening provided in the base member for same;
   placing the cover over an open face of said base member with the wings of the cover overlying the flanges of the base member;
   engaging a first cooperating screw in one bore of the cover and beginning engagement thereof within a corresponding base member channel;
   fully engaging a second cooperating screw in a second bore of the cover; and
   fully completing engagement of the first screw.

5. A covered conduit box having a housing which incorporates a cover member and a base member engageable to one another by screws, the base member including a pair of flanges which frame two opposite sides of an open surface thereof over which the cover seats, the flanges angling away from cooperating wings provided on the cover, a bore for a screw provided in each of the cover wings and being downwardly and outwardly stepped, with channels being provided within and extending downwardly from the flanges of the base member which coact with the bores in the cover wings.

6. The conduit box of claim 5 wherein said bore includes a narrow bore portion equal in thickness to an unthreaded area adjacent the head of the screw and having a diameter approximately equal to a root diameter of the screw creating a first bore portion and having a wider bore portion formed therebeneath which has a diameter greater than a crest diameter of the screw thread.

7. The conduit box of claim 6 wherein said angled base member flanges are angled away from the cover wings by approximately 6 degrees.

8. The conduit box of claim 7 wherein said flanges are pulled against said wings upon engagement of a screw therebetween, the screw remaining angled between the two.

9. The conduit box of claim 8 wherein the bores are coined into the cover wings.

10. The conduit box of claim 9 wherein the channels in the base member flanges are extruded.

11. A method of forming a conduit box having a cover which captures screws and engaging same to a housing of an electric motor for containment of motor circuitry wiring therein, the method comprising the steps of:
   stamping out a five sided conduit box base member, the base member including a pair of flanges framing two sides of an open surface thereof and extending outwardly from supporting sidewalls thereof, and said flanges each including an extruded perpendicular channel therein;

stamping out a planar cover member having two wings therein which overlie the flanges on the conduit box base member when placed thereover, the wings each incorporating a coined, stepped in diameter bore therein which overlies a corresponding channel in the base member, a first, upper smaller in diameter portion of the bore having a diameter slightly greater than the root diameter of thread of the screw but less than the crest diameter of the thread and a second lower larger in diameter portion having a diameter greater than the crest diameter of the thread;

flexing the base member flanges toward the supporting sidewalls at an acute angle thereto;

mounting the flanged base member to the motor housing;

feeding motor circuitry wiring into the base member through opening provided in the base member for same;

placing the cover over an open face of said base member with the wings of the cover overlying the flanges of the base member;

completely engaging a first cooperating screw to said cover and said flange;

pressing said other cover wing toward said other base flange; and fully engaging a second cooperating screw in a second bore of the cover.

* * * * *